(12) United States Patent
Khoshnevisan et al.

(10) Patent No.: US 12,309,715 B2
(45) Date of Patent: May 20, 2025

(54) SOUNDING REFERENCE SIGNAL POWER CONTROL CONSISTENCY WITH UNIFIED TRANSMISSION CONFIGURATION INDICATORS

(71) Applicant: QUALCOMM Incorporated, San Diego, CA (US)

(72) Inventors: Mostafa Khoshnevisan, San Diego, CA (US); Yitao Chen, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 17/660,410

(22) Filed: Apr. 24, 2022

(65) Prior Publication Data

US 2023/0345382 A1 Oct. 26, 2023

(51) Int. Cl.
*H04W 52/32* (2009.01)
*H04L 5/00* (2006.01)
*H04W 52/36* (2009.01)

(52) U.S. Cl.
CPC ......... *H04W 52/325* (2013.01); *H04L 5/0051* (2013.01); *H04W 52/367* (2013.01)

(58) Field of Classification Search
CPC . H04W 52/325; H04W 52/367; H04W 52/06; H04W 52/08; H04W 52/10; H04W 52/146; H04W 52/242; H04L 5/0051; H04L 5/0091

See application file for complete search history.

(56) References Cited

U.S. PATENT DOCUMENTS

2022/0264475 A1* 8/2022 Yi .................. H04W 72/046
2022/0330167 A1 10/2022 Chen et al.
2022/0369235 A1 11/2022 Chen

FOREIGN PATENT DOCUMENTS

WO 2021147001 A1 7/2021
WO 2021155541 A1 8/2021

OTHER PUBLICATIONS

International Search Report and Written Opinion—PCT/US2023/016252—ISA/EPO—Jun. 7, 2023.

* cited by examiner

*Primary Examiner* — Dinh Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive a sounding reference signal (SRS) configuration comprising a first List of SRS resource sets indicating a first SRS resource set and a second List of SRS resource sets indicating a second SRS resource set. The UE may determine, based at least in part on a transmission configuration indicator (TCI) state configuration that indicates at least one of a first TCI state or a second TCI state, a set of power control parameters corresponding to the first SRS resource set and the second SRS resource set. The UE may transmit, based at least in part on the set of power control parameters, a first SRS associated with the first SRS resource set and a second SRS associated with the second SRS resource set. Numerous other aspects are described.

26 Claims, 8 Drawing Sheets

SOUNDING REFERENCE SIGNAL POWER CONTROL CONSISTENCY WITH UNIFIED TRANSMISSION CONFIGURATION INDICATORS

FIELD OF THE DISCLOSURE

Aspects of the present disclosure generally relate to wireless communication and to techniques and apparatuses for sounding reference signal power control consistency with unified transmission configuration indicators.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a sounding reference signal (SRS) configuration comprising a first list of SRS resource sets indicating a first SRS resource set and a second list of SRS resource sets indicating a second SRS resource set. The one or more processors may be configured to determine, based at least in part on a transmission configuration indicator (TCI) state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state. The one or more processors may be configured to transmit, based at least in part on the set of power control parameters, a first SRS associated with the first SRS resource set. The one or more processors may be configured to transmit, based at least in part on the set of power control parameters, a second SRS associated with the second SRS resource set.

Some aspects described herein relate to a network node for wireless communication. The network node may include a memory and one or more processors coupled to the memory. The one or more processors may be configured to transmit an SRS configuration comprising a first list of SRS resource sets indicating a first SRS resource set and a second list of SRS resource sets indicating a second SRS resource set. The one or more processors may be configured to receive a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state. The one or more processors may be configured to receive, based at least in part on the set of power control parameters, a second SRS associated with the second SRS resource set.

Some aspects described herein relate to a method of wireless communication performed by a UE. The method may include receiving an SRS configuration comprising a first list of SRS resource sets indicating a first SRS resource set and a second list of SRS resource sets indicating a second SRS resource set. The method may include determining, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state. The method may include transmitting, based at least in part on the set of power control parameters, a first SRS associated with the first SRS resource set. The method may include transmitting, based at least in part on the set of power control parameters, a second SRS associated with the second SRS resource set.

Some aspects described herein relate to a method of wireless communication performed by a network node. The method may include transmitting an SRS configuration comprising a first list of SRS resource sets indicating a first SRS resource set and a second list of SRS resource sets indicating a second SRS resource set. The method may include receiving a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state. The method may include receiving, based at least in part on the set of power control parameters, a second SRS associated with the second SRS resource set.

Some aspects described herein relate to a non-transitory computer-readable medium that stores a set of instructions for wireless communication by a UE. The set of instructions, when executed by one or more processors of the UE, may cause the UE to receive an SRS configuration comprising a first list of SRS resource sets indicating a first SRS resource set and a second list of SRS resource sets indicating a second SRS resource set. The set of instructions, when executed by one or more processors of the UE, may cause the UE to determine, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state. The set of instructions, when executed by one or more processors of the UE, may cause the UE to transmit, based at least in part on the set of power control parameters, a first SRS associated with the first SRS resource set. The set of instructions, when executed by one or more processors of the UE, may cause the UE to transmit, based at least in part on the set of power control parameters, a second SRS associated with the second SRS resource set.

Some aspects described herein relate to a non-transitory computer-readable medium that stores a set of instructions for wireless communication by a network node. The set of instructions, when executed by one or more processors of the network node, may cause the network node to transmit an SRS configuration comprising a first list of SRS resource sets indicating a first SRS resource set and a second list of SRS resource sets indicating a second SRS resource set. The set of instructions, when executed by one or more processors of the network node, may cause the network node to receive a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state. The set of instructions, when executed by one or more processors of the network node, may cause the network node to receive, based at least in part on the set of power control parameters, a second SRS associated with the second SRS resource set.

Some aspects described herein relate to an apparatus for wireless communication. The apparatus may include means for receiving an SRS configuration comprising a first list of SRS resource sets indicating a first SRS resource set and a second list of SRS resource sets indicating a second SRS resource set. The apparatus may include means for determining, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state. The apparatus may include means for transmitting, based at least in part on the set of power control parameters, a first SRS associated with the first SRS resource set. The apparatus may include means for transmitting, based at least in part on the set of power control parameters, a second SRS associated with the second SRS resource set.

Some aspects described herein relate to an apparatus for wireless communication. The apparatus may include means for transmitting an SRS configuration comprising a first list of SRS resource sets indicating a first SRS resource set and a second list of SRS resource sets indicating a second SRS resource set. The apparatus may include means for receiving a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state. The apparatus may include means for receiving, based at least in part on the set of power control parameters, a second SRS associated with the second SRS resource set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
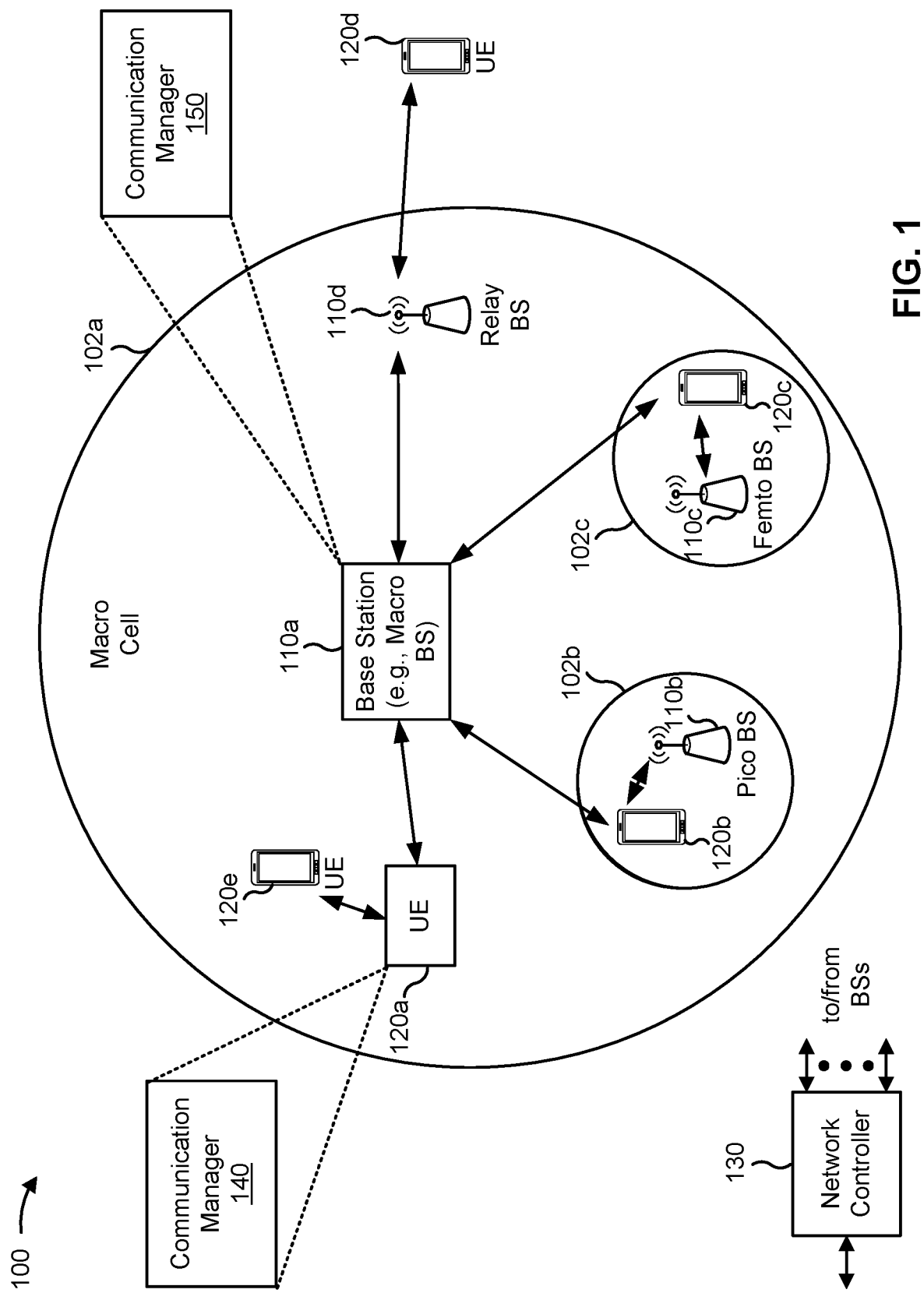
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a sounding reference signal (SRS) configuration comprising a first list of SRS resource sets indicating a first SRS resource set and a second list of SRS resource sets indicating a second SRS resource set; determine, based at least in part on a transmission configuration indicator (TCI) state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state; transmit, based at least in part on the set of power control parameters, a first SRS associated with the first SRS resource set; and transmit, based at least in part on the set of power control parameters, a second SRS associated with the second SRS resource set. Additionally, or alternatively, the communication manager 140 may perform one or more other operations described herein.

In some aspects, a network node may include a communication manager 150. As described in more detail elsewhere herein, the communication manager 150 may transmit an SRS configuration comprising a first list of SRS resource sets indicating a first SRS resource set and a second list of SRS resource sets indicating a second SRS resource set; receive a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state; and receive, based at least in part on the set of power control parameters, a second SRS associated with the second SRS resource set. Additionally, or alternatively, the communication manager 150 may perform one or more other operations described herein.

As indicated above, FIG. 1 is provided as an example. Other examples may differ from what is described with regard to FIG. 1.

Figure 2:
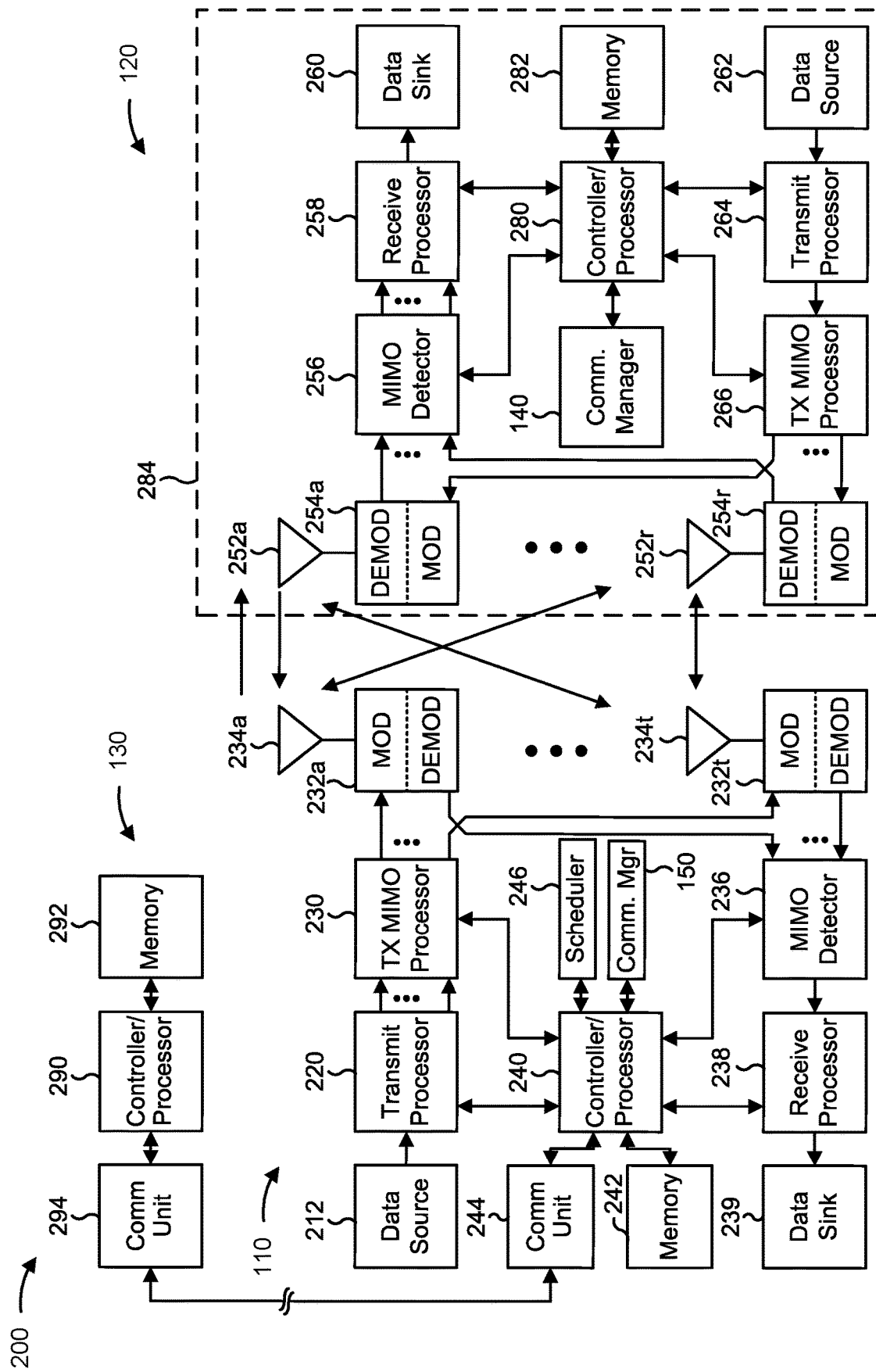
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with SRS power control consistency with unified TCIs, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE includes means for receiving an SRS configuration comprising a first list of SRS resource sets indicating a first SRS resource set and a second list of SRS resource sets indicating a second SRS resource set; means for determining, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state; means for transmitting, based at least in part on the set of power control parameters, a first SRS associated with the first SRS resource set; and/or means for transmitting, based at least in part on the set of power control parameters, a second SRS associated with the second SRS resource set. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an SRS configuration comprising a first list of SRS resource sets indicating a first SRS resource set and a second list of SRS resource sets indicating a second SRS resource set; means for receiving a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state; and/or means for receiving, based at least in part on the set of power control parameters, a second SRS associated with the second SRS resource set. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
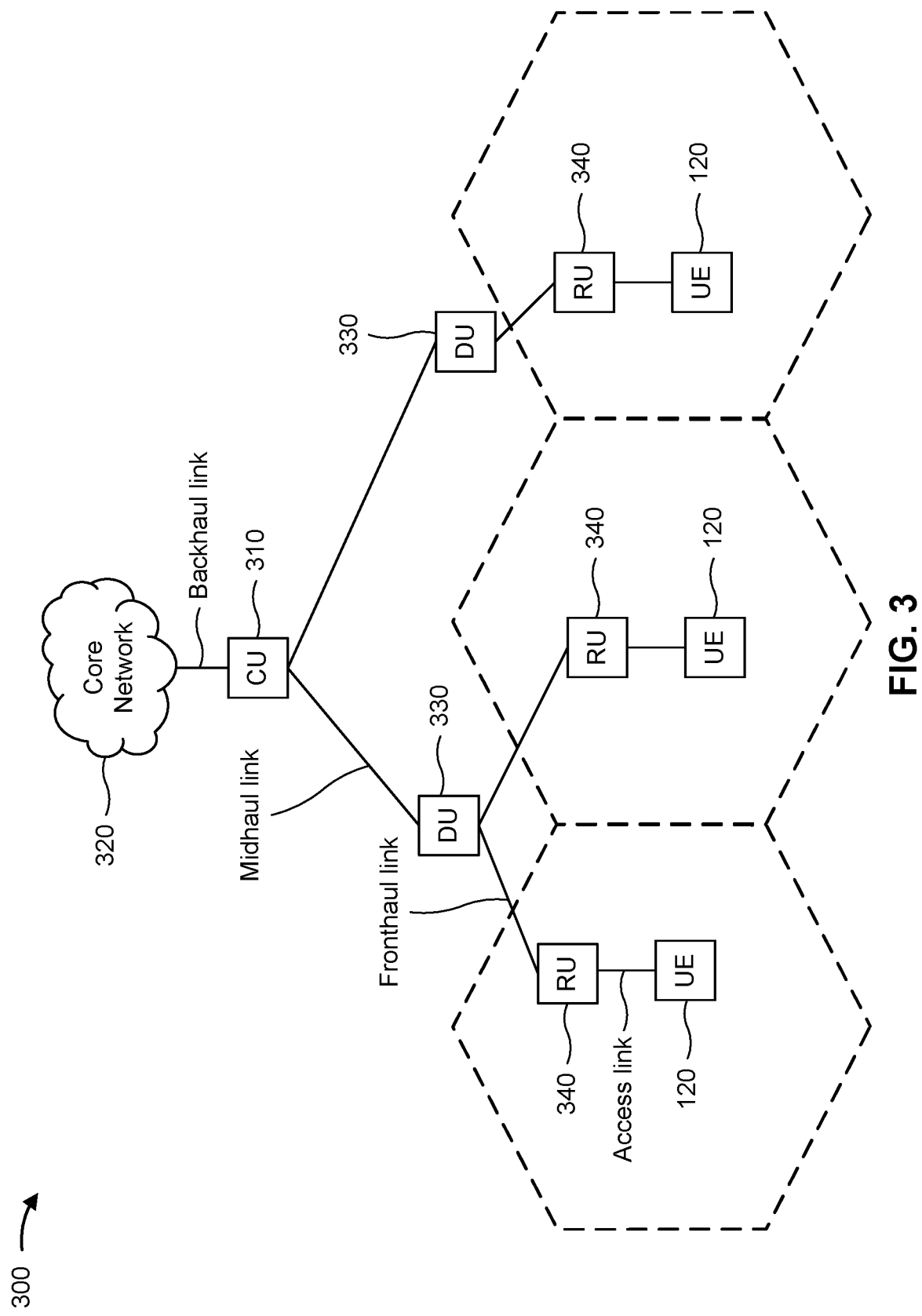
FIG. 3 is a diagram illustrating an example of open radio access network communications, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A base station 110 may configure a UE 120 with one or more SRS resource sets to allocate resources for SRS transmissions by the UE 120. For example, a configuration for SRS resource sets may be indicated in an RRC message (for example, an RRC configuration message or an RRC reconfiguration message). An SRS resource set may include one or more SRS resources, which may include time resources or frequency resources (for example, a slot, a symbol, a resource block, or a periodicity for the time resources). An SRS resource indicator (SRI) field in a downlink control information (DCI) transmission may be used to indicate SRS resources to be used for an uplink transmission. The SRI may indicate the uplink transmission rank and the set of precoders for the UE to use for the uplink transmission.

An SRS resource may include one or more antenna ports on which an SRS is to be transmitted (for example, in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (for example, in an SRS-ResourceSet information element) for the SRS resource set. For example, an SRS resource set may have a use case of antenna switching, codebook, non-codebook, or beam management.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (for example, an SRS transmitted using a resource of an antenna switching SRS resource set) to acquire downlink CSI (for example, to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (for example, using a precoder codebook), the base station 110 may use a codebook SRS (for example, an SRS transmitted using a resource of a codebook SRS resource set) to acquire uplink CSI (for example, to determine an uplink precoder to be indicated to the UE 120 and used by the UE 120 to communicate with the base station 110). In some aspects, virtual ports (for example, a combination of two or more antenna ports) with a maximum transmit power may be supported at least for a codebook SRS.

A codebook SRS resource set also may be used to facilitate codebook-based physical uplink shared channel (PUSCH) transmission. In codebook-based PUSCH transmission, a UE can be configured with only one SRS resource set with a "usage" indicator set to "codebook." In codebook-based PUSCH transmission, a maximum of 4 SRS resources within the set can be configured for the UE. Each SRS resource can be RRC-configured with a number of ports (for example, using a parameter nrofSRS-Ports). The SRI field in the DCI that schedules the PUSCH can indicate one SRS resource. The number of ports configured for the indicated SRS resource determines the number of antenna ports used for the PUSCH transmission. In codebook-based PUSCH transmission, the PUSCH transmission is transmitted with the same spatial domain filter (for example, uplink beam) as the indicated SRS resources. The number of transmission layers (rank) and the transmitted precoding matrix indicator (TPMI) for the scheduled PUSCH is determined from a separate DCI field.

A non-codebook SRS resource set may be used to indicate uplink CSI when the UE 120 selects an uplink precoder (for example, instead of the base station 110 indicated an uplink precoder to be used by the UE 120). For example, when the UE 120 is configured to select an uplink precoder, the base station 110 may use a non-codebook SRS (for example, an SRS transmitted using a resource of a non-codebook SRS resource set) to acquire uplink CSI. In this case, the non-codebook SRS may be precoded using a precoder selected by the UE 120 (for example, which may be indicated to the base station 110).

A non-codebook SRS resource set also may be used to facilitate non-codebook-based PUSCH transmission. In non-codebook-based PUSCH transmission, a UE can be configured with only one SRS resource set with the "usage" indicator set to "noncodebook." In non-codebook PUSCH transmission, a maximum of 4 SRS resources within the set can be configured for the UE. Each SRS resource has one port. The SRI field in the DCI that schedules the PUSCH transmission can indicate one or multiple SRS resources. The number of indicated SRS resources determines the rank for the scheduled PUSCH transmission, and the PUSCH transmission is transmitted with the same precoder as well as the same spatial domain filter (for example, beam) as the indicated SRS resources.

In some cases, a wireless communication standard may specify one or more SRI indication tables to facilitate SRI signalling. SRI indication tables can be used to identify SRS resources based on a number of SRS resources indicated by an SRI, as well as to indicate a number of bits used to transmit the SRI. For example, according to a wireless communication standard, a number of bits used to transmit an SRI can be calculated as $\lceil \log_2(N_{SRS}) \rceil$ bits based on an SRI table, where a usage indicator is set to codebook, and $N_{SRS}$ is the number of configured SRS resources in an SRS resource set configured by a list of SRS resource sets (for example, represented by a higher layer parameter srs-ResourceSetToAddModList). Table 1 depicts an example of an SRI table for codebook based PUSCH transmission, where $N_{SRS}=4$.

TABLE 1

| Bit field mapped to index | SRI(s), $N_{SRS} = 4$ |
| --- | --- |
| 0 | 0 |
| 1 | 1 |
| 2 | 2 |
| 3 | 3 |

In some cases, according to a wireless communication standard, a number of bits used to transmit an SRI can be calculated as $$\left\lceil \log_2\left( \sum_{k=1}^{\min\{L_{max}, N_{SRS}\}} \binom{N_{SRS}}{k} \right) \right\rceil$$

bits based on an SRI table, where a usage indicator indicates noncodebook, $L_{max}$ indicates a maximum number of transmission layers, and $N_{SRS}$ is the number of configured SRS resources in an SRS resource set configured by a list of SRS resource sets (for example, represented by a higher layer parameter srs-ResourceSetToAddModList). Table 2 depicts an example of an SRI table for non-codebook based PUSCH transmission, where $L_{max}=4$.

TABLE 2

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6 | 0, 1, 2 | 6 | 0, 3 |
|  |  | 7 | reserved | 7 | 1, 2 |
|  |  |  |  | 8 | 1, 3 |

TABLE 2-continued

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
| --- | --- | --- | --- | --- | --- |
|  |  |  |  | 9 | 2, 3 |
|  |  |  |  | 10 | 0, 1, 2 |
|  |  |  |  | 11 | 0, 1, 3 |
|  |  |  |  | 12 | 0, 2, 3 |
|  |  |  |  | 13 | 1, 2, 3 |
|  |  |  |  | 14 | 0, 1, 2, 3 |
|  |  |  |  | 15 | reserved |

As indicated above, DCI transmissions may be used to transmit SRIs for codebook or non-codebook based PUSCH transmissions that are scheduled by a DCI transmission, as in the case of a dynamic grant PUSCH (DG-PUSCH), or activated by a DCI, as in the case of a Type 2 configured grant (CG) PUSCH. However, for Type 1 CG PUSCH, all parameters are RRC configured (for example, not indicated in DCI). An SRS resource indicator in these cases can be an RRC parameter "srs-ResourceIndicator," which can be configured as part of that CG configuration in a CG configuration parameter ("rrc-ConfiguredUplinkGrant"). This SRS resource indicator determines the SRS resource or SRS resources associated with the PUSCH transmission, which in turn determines the beam, precoding, and number of PUSCH ports for the PUSCH transmission for Type 1 CG PUSCH. This RRC parameter "srs-ResourceIndicator" can be interpreted based on specified SRI tables (for example, Table 1 or Table 2, above). The interpretation can depend on codebook versus non-codebook based PUSCH as well as the number of SRS resources in the SRS resource set (similar to the case of DG-PUSCH).

Some wireless communication standards specify a DCI format 0_2 for scheduling PUSCH. The purpose of the DCI format 0_2 is DCI size reduction by decreasing the number of bits needed for each DCI field based on RRC configuration. SRS resource sets (for both codebook and non-codebook) can be separately configured for a PUSCH scheduled by DCI format 0_2. A list of SRS resource sets represented by RRC parameter srs-ResourceSetToAddModListDCI-0-2 can be used for DCI format 0_2 (similar to the srs-ResourceSetToAddModList used for DCI format 0_1). For codebook PUSCH, only one SRS resource set with usage set to "codebook" can be configured within srs-ResourceSetToAddModListDCI-0-2. For non-codebook PUSCH, only one SRS resource set with usage set to "noncodebook" can be configured within srs-ResourceSetToAddModListDCI-0-2.

A smaller number of SRS resources ($N_{SRS,0\_2}$) within an SRS resource set can be configured for srs-ResourceSetToAddModListDCI-0-2, which can result in smaller SRI bitwidth. The $N_{SRS,0\_2}$ SRS resources within the SRS resource set for DCI format 0_2 can be the first $N_{SRS,0\_2}$ SRS resources within the SRS resource set for DCI format 0_1. In this way, UE complexity can be prevented from increasing, since for DCI format 0_2, a subset of SRS resources in the SRS resource set configured for DCI format 0_1 can be configured.

Furthermore, to facilitate effective communications, all configurations of the SRS resource set in srs-ResourceSetToAddModListDCI-0-2 should be the same as the SRS resource set in srs-ResourceSetToAddModList. For example, power control parameters (e.g., PL-RS, alpha, P0, closed loop index) can be the same to ensure that UE complexity is not increased. For a physical uplink control channel (PUCCH) and/or a PUSCH, one unified TCI state (joint TCI or UL TCI) among the list can be indicated by a MAC control element (MAC-CE) and/or DCI, which determines the beam as well as power control parameters for the PUCCH and/or the PUSCH.

For SRS, two behaviors can be defined. The two behaviors can include a first behavior in which if the SRS resource set shares the same indicated TCI state as the TCI state for PUCCH and/or PUSCH (e.g., based on an RRC parameter useIndicatedTCIState configured per SRS resource set), the SRS resource set follows the SRS power control parameters associated with the indicated TCI state. In a second behavior. In a second behavior, (e.g., if useIndicatedTCIState is not provided for the SRS resource set), all SRS resource in the SRS resource set follow the SRS power control parameters (PL-RS, P0, alpha, closed loop index) associated with the configured TCI state for the SRS resource with lowest ID among the SRS resources of the SRS resource set. This rule can be based on the fact that TCI state is configured per SRS resource (and not per SRS resource set) and can be used to keep SRS power control at the SRS resource set level (instead of SRS resource level).

The second behavior, combined with the fact that SRS resource sets for DCI format 0_2 can be separately configured, can result in different power control parameters for two SRS resource sets (with usage codebook or non-codebook) configured in srs-ResourceSetToAddModList and srs-ResourceSetToAddModListDCI-0-2. This result is not consistent with some specified behaviors in which power control parameters for these two SRS resource sets should be the same. The existing rule that the $N_{SRS,0\_2}$ SRS resources within the SRS resource set for DCI format 0_2 are to be the first $N_{SRS,0\_2}$ SRS resources within the SRS resource set configured by srs-ResourceSetToAddModList" does not address the issue since the order of SRS resources configured for a given SRS resource set is not necessarily in the order of the SRS resource ID, which can also result in potential UE complexity.

Some aspects of the techniques and apparatuses described herein may facilitate correspondence between power control parameters for SRS resource sets. For example, in some aspects, a UE may receive an SRS configuration that includes a first list of SRS resource sets indicating a first SRS resource set and a second list of SRS resource sets indicating a second SRS resource set. The UE may determine, based at least in part on a TCI state configuration that indicates at least one of a first TCI state or a second TCI state, a set of power control parameters corresponding to the first SRS resource set and the second SRS resource set. Each of the first TCI state and the second TCI state may include a downlink TCI state, an uplink TCI state, or a joint downlink/uplink TCI state. The UE may transmit, based at least in part on the set of power control parameters, a first SRS associated with the first SRS resource set. The UE also may transmit, based at least in part on the set of power control parameters, a second SRS associated with the second SRS resource set. In this way, some aspects may facilitate ensuring that the same SRS power control parameters are used for two SRS resource sets in two different lists.

Figure 4:
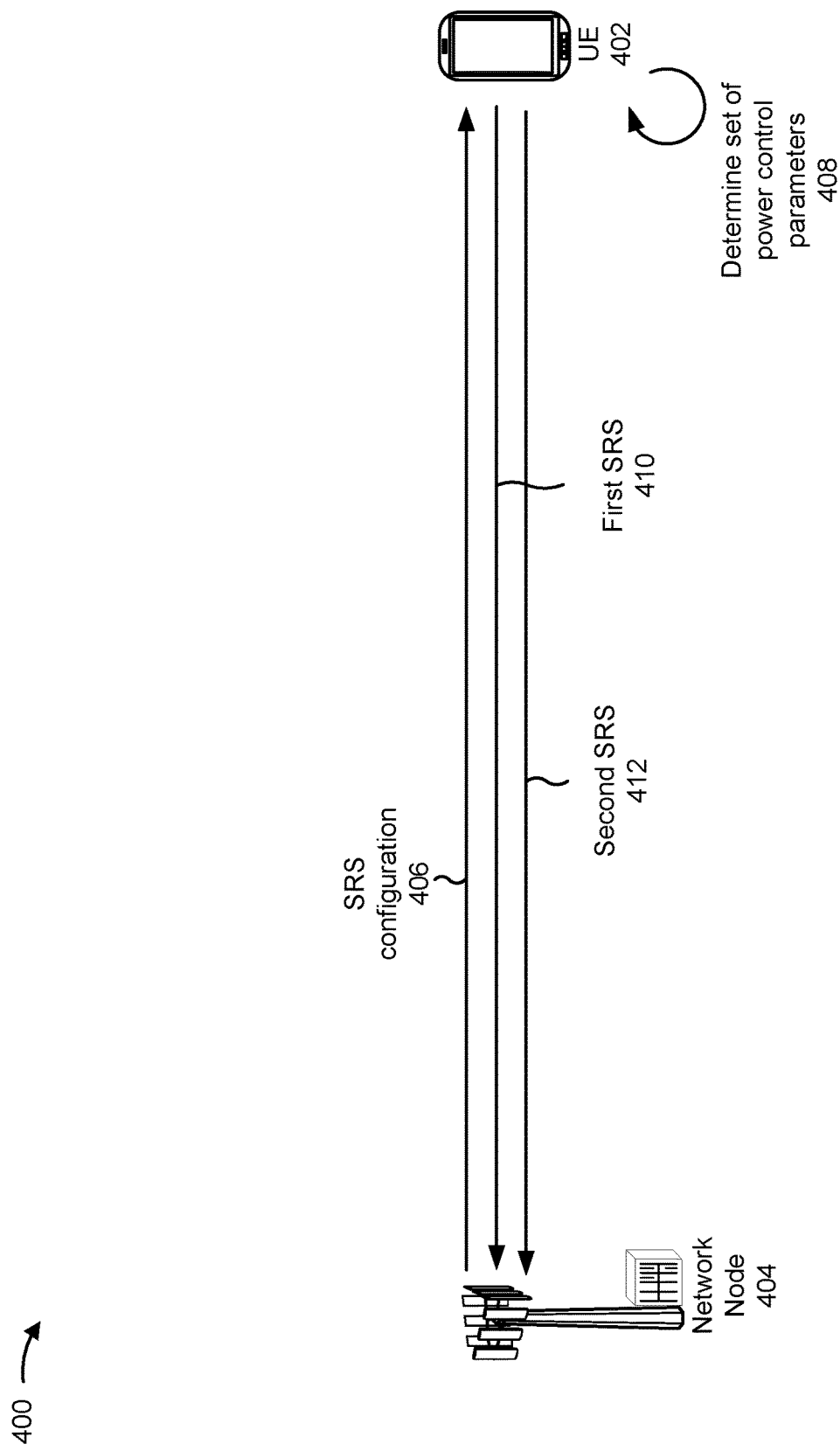
FIG. 4 is a diagram illustrating an example associated with sounding reference signal power control consistency with unified transmission configuration indicators, in accordance with the present disclosure.

FIG. 4 is a diagram illustrating an example 400 associated with SRS power control consistency with unified TCIs, in accordance with the present disclosure. As shown in FIG. 4, a UE 402 and a network node 404 may communicate with one another. For example, the UE 402 may be, or be similar to, the UE 120 depicted in FIGS. 1 and 2. The network node 404 may be, or be similar to, the base station 110 depicted in FIGS. 1 and 2.

As shown by reference number 406, the network node 404 may transmit, and the UE 402 may receive, an SRS configuration. The SRS configuration may include a first list of SRS resource sets indicating a first SRS resource set and a second list of SRS resource sets indicating a second SRS resource set. The SRS configuration may configure one or more SRS resources, which may be organized into SRS resource sets, as explained above.

As shown by reference number 408, the UE 402 may determine, based at least in part on a TCI state configuration that indicates at least one of a first TCI state or a second TCI state, a set of power control parameters corresponding to a first SRS resource set and a second SRS resource set. In some aspects, each of the first TCI state and the second TCI state may include a downlink TCI state, an uplink TCI state, or a joint downlink/uplink TCI state. In some aspects, the set of power control parameters may indicate at least one of a nominal power, a path loss compensation factor, a path loss reference signal, or a closed loop index.

In some aspects, an indicated TCI state may correspond to the first SRS resource set and the second SRS resource set. The indicated TCI state may include the first TCI state or the second TCI state. In some aspects, an indicated TCI state may not correspond to either the first SRS resource set or the second SRS resource set. In some aspects, the set of power control parameters may be associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

In some aspects, the set of power control parameters may be associated with a TCI state associated with an SRS resource having an SRS resource ID value that is a lowest SRS resource ID value among a set of SRS resource ID values corresponding to the first SRS resource set. The set of power control parameters may include a first set of power control parameters associated with a first TCI state of a first SRS resource, of the first SRS resource set, having a first SRS resource ID value that is a lowest SRS resource ID value among a first set of SRS resource ID values associated with the first SRS resource set. In some aspects, the set of power control parameters also may include a second set of power control parameters associated with a second TCI state of a second SRS resource, of the second SRS resource set, having a second SRS resource ID value that is a lowest SRS resource ID value among a second set of SRS resource ID values associated with the second SRS resource set.

In some aspects, the first set of power parameters may be equivalent to the second set of power parameters. The first TCI state may be equivalent to the second TCI state. In some aspects, the first SRS resource may be equivalent to the second SRS resource. For example, the equivalencies indicated above may be configured by the network node 404. In some aspects, a first list of SRS resources configured for the first SRS resource set may be ordered according to an order of the first set of SRS resource ID values, and a second list of SRS resources configured for the second SRS resource set may be ordered according to an order of the second set of SRS resource ID values. The first SRS resource may be listed within a first subset of SRS resources of the first SRS resource set. In some aspects, a quantity of SRS resources in the first subset of SRS resources may be equivalent to a quantity of SRS resources of the second SRS resource set.

In some aspects, the first SRS resource set may correspond to a first SRS resource set ID value, and the second SRS resource set may correspond to a second SRS resource set ID value. The first list of SRS resource sets may indicate a first additional SRS resource set corresponding to a first additional SRS resource set ID value, and the second list of SRS resource sets may indicate a second additional SRS resource set corresponding to a second additional SRS resource set ID value. The first SRS resource set may correspond to an SRS resource set ID value that is a lowest value or a highest value between the first SRS resource set ID value and the first additional SRS resource set ID value, and the second SRS resource set may correspond to an SRS resource set ID value that is a lowest value or a highest value between the second SRS resource set ID value and the second additional SRS resource set ID value.

As shown by reference number 410, the UE 402 may transmit, and the network node 404 may receive, a first SRS based at least in part on the set of power control parameters. The first SRS may be associated with the first SRS resource set. As shown by reference number 412, the UE 402 may transmit, and the network node 404 may receive, based at least in part on the set of power control parameters, a second SRS associated with the second SRS resource set.

Some aspects described above may be implemented, for example, by a wireless communication standard and/or a configuration indicated by a network node. For example, in some aspects, when a first SRS resource set with usage set to codebook or non-codebook is configured in a first list (e.g., srs-ResourceSetToAddModList) and a second SRS resource set with usage set to codebook or non-codebook is configured in a second list (e.g., srs-ResourceSetToAdd-ModListDCI-0-2), and if the UE 402 is configured with DLorJoint-TCIState or UL-TCIState, the UE 402 may determine a same set of power control parameters (e.g., P0, alpha, PL-RS, closed loop index) for the two SRS resource sets.

The two SRS resource sets may share an indicated TCI state (e.g., for PUSCH/PUCCH) or the two SRS resource sets may not share the indicated TCI state. In some aspects, for example, the UE 402 may expect the same configuration of "useIndicatedTCIState" for the two SRS resource sets. If the two SRS resource sets do not share the indicated TCI state (e.g., if "useIndicatedTCIState" is not provided for any of them), the SRS power control parameters for the two SRS resource sets may be determined based on one or more rules that may be specified by a wireless communication standard and/or a configured by a network node (e.g., 404). The one or more rules may indicate, for example, that the set of SRS power control parameters to be used is the set of power control parameters associated with the TCI state of an SRS resource with a lowest SRS resource ID among SRS resources of both SRS resource sets, the set of power control parameters associated with the TCI state of an SRS resource with a lowest ID among SRS resources of the first SRS resource set. In some aspects, the outcome of using a same set of SRS power parameters may be achieved using a restriction that SRS resources of the second SRS resource set is a subset of the first SRS resource set.

In some aspects, the one or more rules may indicate that the set of SRS power control parameters to be used is the set of power control parameters associated with the TCI state of an SRS resource with a lowest ID among SRS resources of the corresponding SRS resource set. In some implementations, the UE 402 may expect the same set of power control parameters by, for example, restricting the two set of power control parameters associated with the two TCI states of the two SRS resources with the lowest IDs to be the same, by restricting the two TCI states of the two SRS resources with the lowest IDs to be the same, or by restricting the two SRS resources with the lowest IDs to be same. For example, the one or more rules may indicate that the list of SRS resources configured for a given SRS resource set are to be in the same order as the SRS resource IDs. In some aspects, the one or more rules may restrict that the SRS resource with a lowest ID within the first SRS resource set is within the first $N_{SRS,\ 0\_2}$ SRS resources of the first SRS resource set.

In some aspects, the one or more rules may indicate that, when the UE 402 is configured with two SRS resource sets with usage set to codebook or non-codebook in srs-ResourceSetToAddModList and with another two SRS resource sets with usage set to codebook or non-codebook in srs-ResourceSetToAddModListDCI-0-2, the shared set of SRS power control parameters may include the first SRS resource set (with a lower ID) of srs-ResourceSetToAddModList and the first SRS resource set (with a lower ID) of srs-ResourceSetToAddModListDCI-0-2. For example, the two SRS resources may be the "first" and "second" SRS resource sets described above. In some aspects, based on the second SRS resource set (with a higher ID) of srs-ResourceSetToAddModList and the second SRS resource set (with higher ID) of srs-ResourceSetToAddModListDCI-0-2). For example, the two SRS resources may be the "first" and "second" SRS resource sets described above.

As indicated above, FIG. 3 is provided as an example. Other examples may differ from what is described with regard to FIG. 3.

Figure 5:
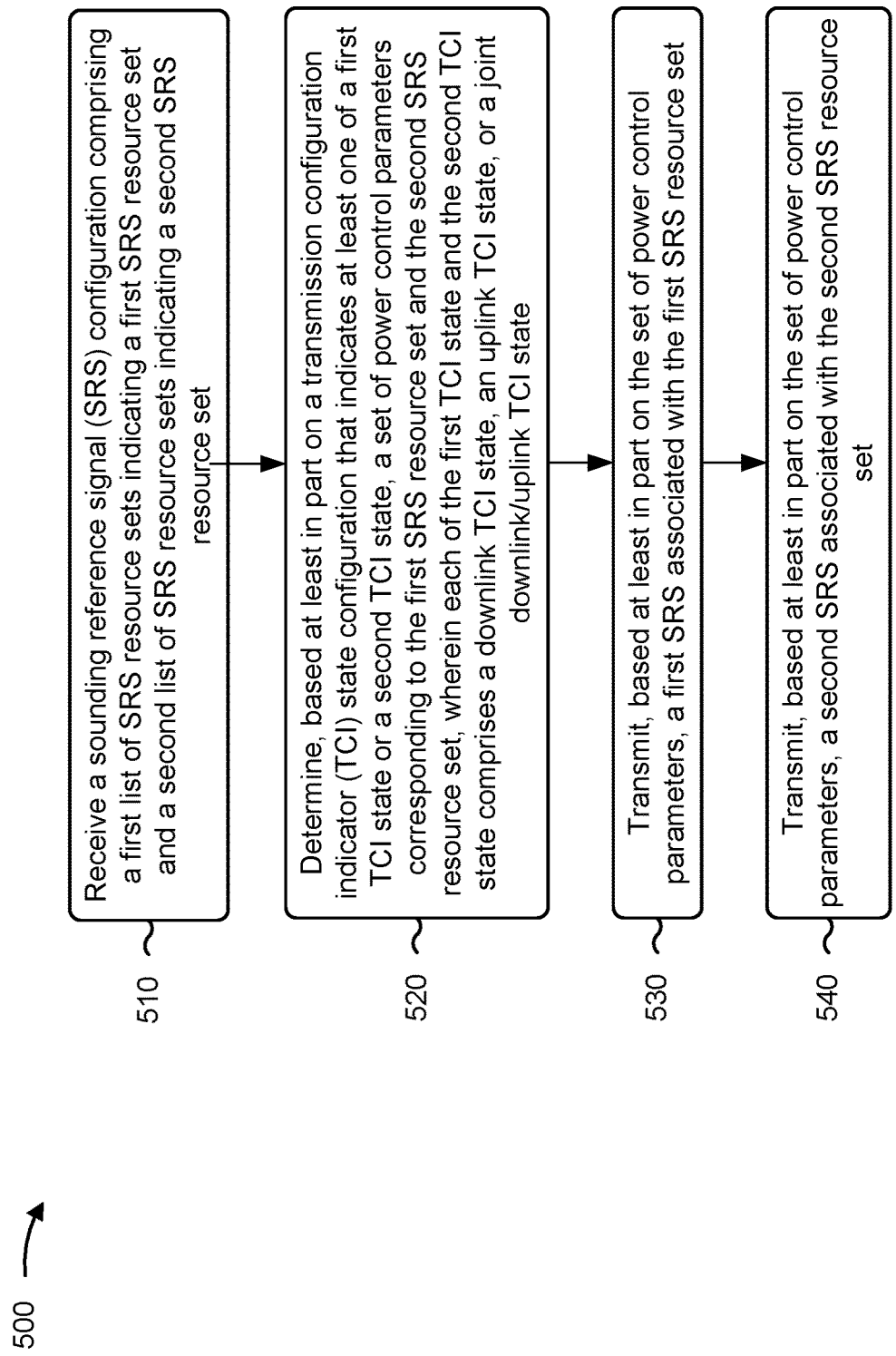
FIGS. 5 and 6 are diagrams illustrating examples associated with sounding reference signal power control consistency with unified transmission configuration indicators, in accordance with the present disclosure.

FIG. 5 is a diagram illustrating an example process 500 performed, for example, by a UE, in accordance with the present disclosure. Example process 500 is an example where the UE (e.g., UE 402) performs operations associated with SRS power control consistency with unified TCIs.

As shown in FIG. 5, in some aspects, process 500 may include receiving an SRS configuration comprising a first list of SRS resource sets indicating a first SRS resource set and a second list of SRS resource sets indicating a second SRS resource set (block 510). For example, the UE (e.g., using communication manager 708 and/or reception component 702, depicted in FIG. 7) may receive an SRS configuration comprising a first list of SRS resource sets indicating a first SRS resource set and a second list of SRS resource sets indicating a second SRS resource set, as described above.

As further shown in FIG. 5, in some aspects, process 500 may include determining, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state (block 520). For example, the UE (e.g., using communication manager 708 and/or determination component 710, depicted in FIG. 7) may determine, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state, as described above.

As further shown in FIG. 5, in some aspects, process 500 may include transmitting, based at least in part on the set of power control parameters, a first SRS associated with the first SRS resource set (block 530). For example, the UE (e.g., using communication manager 708 and/or transmission component 704, depicted in FIG. 7) may transmit, based at least in part on the set of power control parameters, a first SRS associated with the first SRS resource set, as described above.

As further shown in FIG. 5, in some aspects, process 500 may include transmitting, based at least in part on the set of power control parameters, a second SRS associated with the second SRS resource set (block 540). For example, the UE (e.g., using communication manager 708 and/or transmission component 704, depicted in FIG. 7) may transmit, based at least in part on the set of power control parameters, a second SRS associated with the second SRS resource set, as described above.

Process 500 may include additional aspects, such as any single aspect or any combination of aspects described below and/or in connection with one or more other processes described elsewhere herein.

In a first aspect, the set of power control parameters indicates at least one of a nominal power, a path loss compensation factor, a path loss reference signal, or a closed loop index. In a second aspect, alone or in combination with the first aspect, an indicated TCI state corresponds to the first SRS resource set and the second SRS resource set, the indicated TCI state comprising the first TCI state or the second TCI state. In a third aspect, alone or in combination with one or more of the first and second aspects, an indicated TCI state does not correspond to either the first SRS resource set or the second SRS resource set.

In a fourth aspect, alone or in combination with one or more of the first through third aspects, the set of power control parameters is associated with a TCI state associated with an SRS resource having an SRS resource ID value that is a lowest SRS resource ID value among a set of SRS resource ID values corresponding to a combined set of SRS resources, the combined set of SRS resources corresponding to a union of the first SRS resource set and the second SRS resource set. In a fifth aspect, alone or in combination with one or more of the first through third aspects, the set of power control parameters is associated with a TCI state associated with an SRS resource having an SRS resource ID value that is a lowest SRS resource ID value among a set of SRS resource ID values corresponding to the first SRS resource set.

In a sixth aspect, alone or in combination with one or more of the first through third aspects, the set of power control parameters corresponds to a first set of power control parameters associated with a first TCI state of a first SRS resource, of the first SRS resource set, having a first SRS resource ID value that is a lowest SRS resource ID value among a first set of SRS resource ID values associated with the first SRS resource set, and a second set of power control parameters associated with a second TCI state of a second SRS resource, of the second SRS resource set, having a second SRS resource ID value that is a lowest SRS resource ID value among a second set of SRS resource ID values associated with the second SRS resource set. In a seventh aspect, alone or in combination with the sixth aspect, the first set of power parameters is equivalent to the second set of power parameters. In an eighth aspect, alone or in combination with the sixth aspect, the first TCI state is equivalent to the second TCI state. In a ninth aspect, alone or in combination with the sixth aspect, the first SRS resource is equivalent to the second SRS resource.

In a tenth aspect, alone or in combination with the ninth aspect, a first list of SRS resources configured for the first SRS resource set is ordered according to an order of the first set of SRS resource ID values, and wherein a second list of SRS resources configured for the second SRS resource set is ordered according to an order of the second set of SRS resource ID values. In an eleventh aspect, alone or in combination with the tenth aspect, the first SRS resource is listed within a first subset of SRS resources of the first SRS resource set, wherein a quantity of SRS resources in the first subset of SRS resources is equivalent to a quantity of SRS resources of the second SRS resource set.

In a twelfth aspect, alone or in combination with one or more of the first through eleventh aspects, the first SRS resource set corresponds to a first SRS resource set ID value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value. In a thirteenth aspect, alone or in combination with one or more of the first through eleventh aspects, the first SRS resource set corresponds to a first SRS resource set ID value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
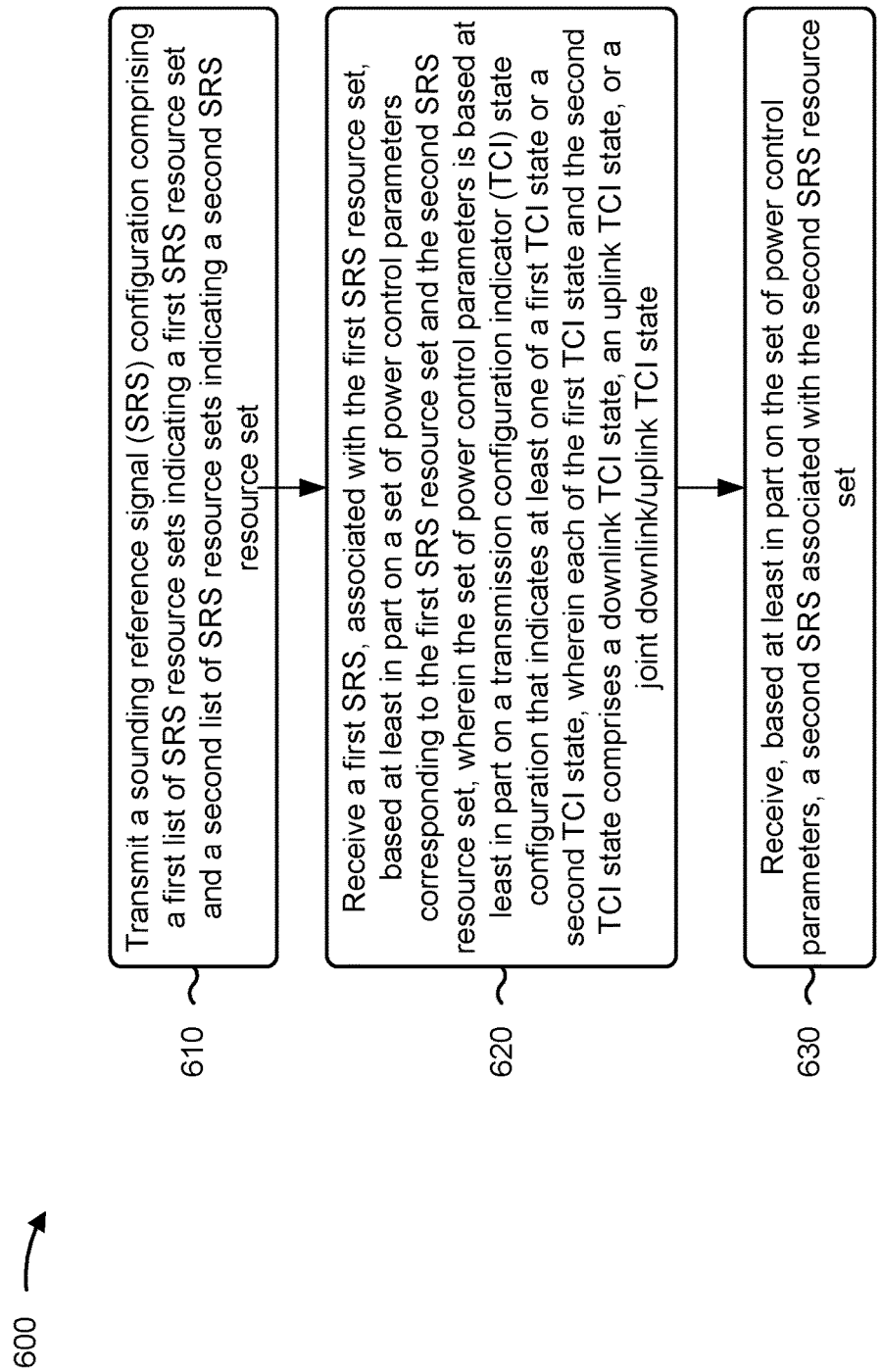

FIG. 6 is a diagram illustrating an example process 600 performed, for example, by a network node, in accordance with the present disclosure. Example process 600 is an example where the network node (e.g., network node 404) performs operations associated with SRS power control consistency with unified TCIs.

As shown in FIG. 6, in some aspects, process 600 may include transmitting an SRS configuration comprising a first list of SRS resource sets indicating a first SRS resource set and a second list of SRS resource sets indicating a second SRS resource set (block 610). For example, the network node (e.g., using communication manager 808 and/or transmission component 804, depicted in FIG. 8) may transmit an SRS configuration comprising a first list of SRS resource sets indicating a first SRS resource set and a second list of SRS resource sets indicating a second SRS resource set, as described above.

As further shown in FIG. 6, in some aspects, process 600 may include receiving a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state (block 620). For example, the network node (e.g., using communication manager 808 and/or reception component 802, depicted in FIG. 8) may receive a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state, as described above.

As further shown in FIG. 6, in some aspects, process 600 may include receiving, based at least in part on the set of power control parameters, a second SRS associated with the second SRS resource set (block 630). For example, the network node (e.g., using communication manager 808 and/or reception component 802, depicted in FIG. 8) may receive, based at least in part on the set of power control parameters, a second SRS associated with the second SRS resource set, as described above.

Process 600 may include additional aspects, such as any single aspect or any combination of aspects described below and/or in connection with one or more other processes described elsewhere herein.

In a first aspect, the set of power control parameters indicates at least one of a nominal power, a path loss compensation factor, a path loss reference signal, or a closed loop index. In a second aspect, alone or in combination with the first aspect, an indicated TCI state corresponds to the first SRS resource set and the second SRS resource set, the indicated TCI state comprising the first TCI state or the second TCI state. In a third aspect, alone or in combination with one or more of the first and second aspects, an indicated TCI state does not correspond to either the first SRS resource set or the second SRS resource set.

In a fourth aspect, alone or in combination with one or more of the first through third aspects, the set of power control parameters is associated with a TCI state associated with an SRS resource having an SRS resource ID value that is a lowest SRS resource ID value among a set of SRS resource ID values corresponding to a combined set of SRS resources, the combined set of SRS resources corresponding to a union of the first SRS resource set and the second SRS resource set. In a fifth aspect, alone or in combination with one or more of the first through third aspects, the set of power control parameters is associated with a TCI state associated with an SRS resource having an SRS resource ID value that is a lowest SRS resource ID value among a set of SRS resource ID values corresponding to the first SRS resource set.

In a sixth aspect, alone or in combination with one or more of the first through third aspects, the set of power control parameters corresponds to a first set of power control parameters associated with a first TCI state of a first SRS resource, of the first SRS resource set, having a first SRS resource ID value that is a lowest SRS resource ID value among a first set of SRS resource ID values associated with the first SRS resource set, and a second set of power control parameters associated with a second TCI state of a second SRS resource, of the second SRS resource set, having a second SRS resource ID value that is a lowest SRS resource ID value among a second set of SRS resource ID values associated with the second SRS resource set.

In a seventh aspect, alone or in combination with the sixth aspect, the first set of power parameters is equivalent to the second set of power parameters. In an eighth aspect, alone or in combination with the sixth aspect, the first TCI state is equivalent to the second TCI state. In a ninth aspect, alone or in combination with the sixth aspect, the first SRS resource is equivalent to the second SRS resource. In a tenth aspect, alone or in combination with the ninth aspect, a first list of SRS resources configured for the first SRS resource set is ordered according to an order of the first set of SRS resource ID values, and wherein a second list of SRS resources configured for the second SRS resource set is ordered according to an order of the second set of SRS resource ID values. In an eleventh aspect, alone or in combination with the tenth aspect, the first SRS resource is listed within a first subset of SRS resources of the first SRS resource set, wherein a quantity of SRS resources in the first subset of SRS resources is equivalent to a quantity of SRS resources of the second SRS resource set.

In a twelfth aspect, alone or in combination with one or more of the first through eleventh aspects, the first SRS resource set corresponds to a first SRS resource set ID value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value. In a thirteenth aspect, alone or in combination with one or more of the first through eleventh aspects, the first SRS resource set corresponds to a first SRS resource set ID value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
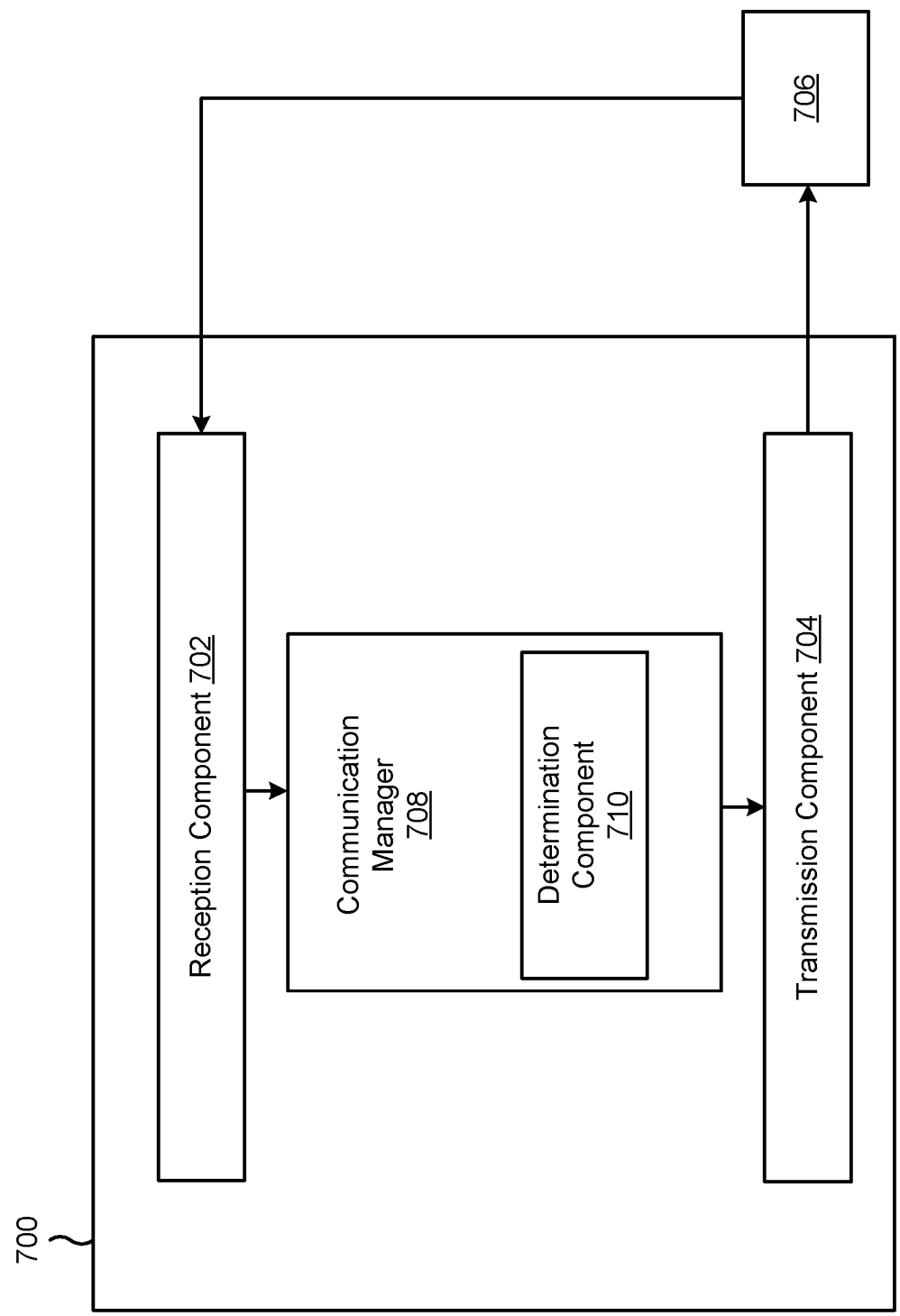
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708. The communication manager 708 may include a determination component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an SRS configuration comprising a first list of SRS resource sets indicating a first SRS resource set and a second list of SRS resource sets indicating a second SRS resource set. The communication manager 708 and/or the determination component 710 may determine, based at least in part on a TCI state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state.

In some aspects, the communication manager 708 may include one or more antennas, a modem, a controller/processor, a memory, or a combination thereof, of the UE described in connection with FIG. 2. In some aspects, the communication manager 708 may be, be similar to, include, or be included in the communication manager 140 depicted in FIGS. 1 and 2. In some aspects, the communication manager 708 may include the reception component 702 and/or the transmission component 704. In some aspects, the determination component 710 may include one or more antennas, a modem, a controller/processor, a memory, or a combination thereof, of the UE described in connection with FIG. 2. In some aspects, the determination component 710 may include the reception component 702 and/or the transmission component 704.

The transmission component 704 may transmit, based at least in part on the set of power control parameters, a first SRS associated with the first SRS resource set. The transmission component 704 may transmit, based at least in part on the set of power control parameters, a second SRS associated with the second SRS resource set.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
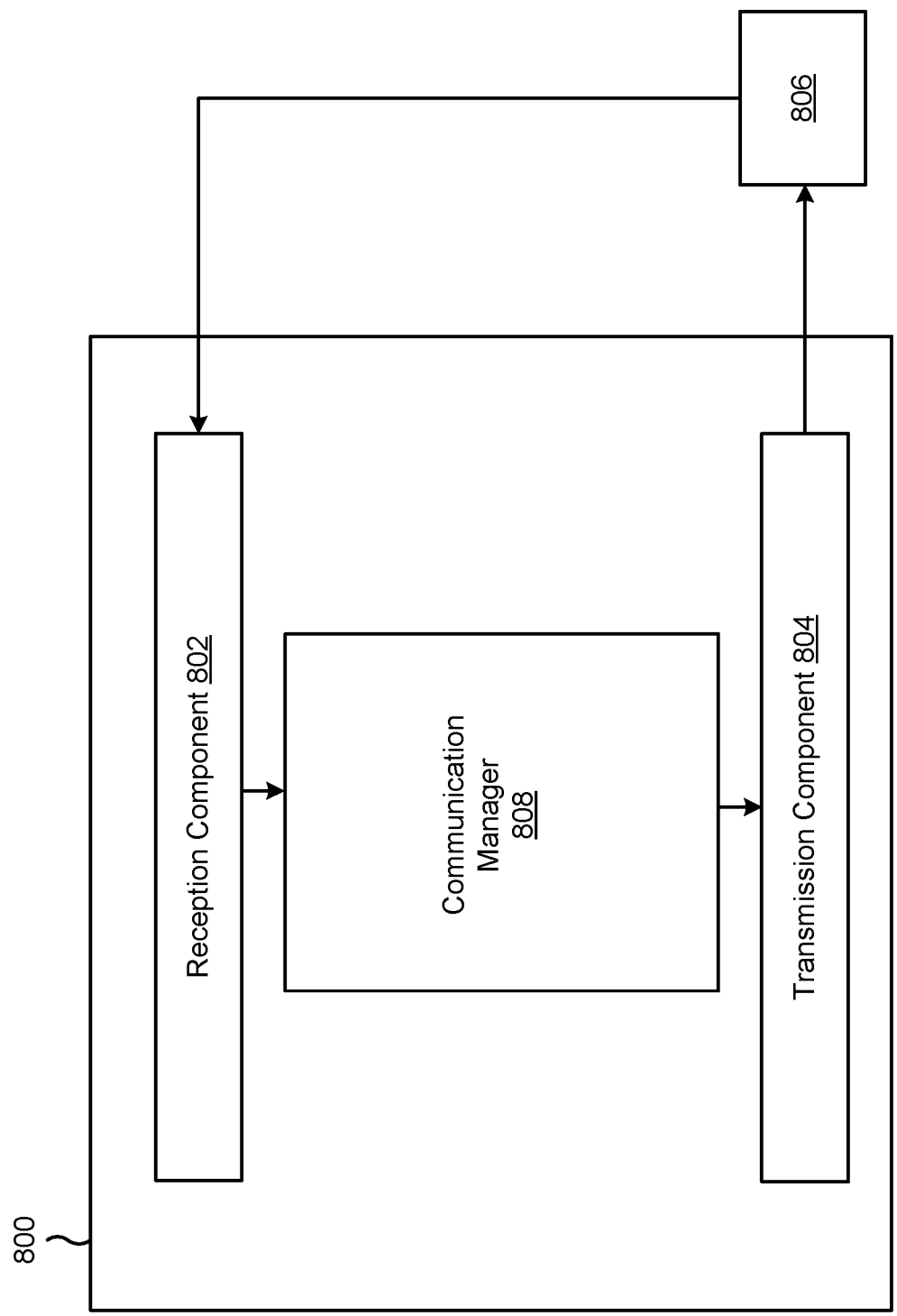

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The communication manager 808 and/or the transmission component 804 may transmit an SRS configuration comprising a first list of SRS resource sets indicating a first SRS resource set and a second list of SRS resource sets indicating a second SRS resource set. The reception component 802 may receive a first SRS, associated with the first SRS resource set, based at least in part on a set of power control parameters corresponding to the first SRS resource set and the second SRS resource set, wherein the set of power control parameters is based at least in part on a TCI state configuration that indicates at least one of a first TCI state or a second TCI state, wherein each of the first TCI state and the second TCI state comprises a downlink TCI state, an uplink TCI state, or a joint downlink/uplink TCI state. The reception component 802 may receive, based at least in part on the set of power control parameters, a second SRS associated with the second SRS resource set.

In some aspects, the communication manager 808 may include one or more antennas, a modem, a controller/processor, a memory, or a combination thereof, of the base station described in connection with FIG. 2. In some aspects, the communication manager 808 may be, be similar to, include, or be included in the communication manager 150 depicted in FIGS. 1 and 2. In some aspects, the communication manager 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a sounding reference signal (SRS) configuration comprising a first list of SRS resource sets indicating a first SRS resource set and a second list of SRS resource sets indicating a second SRS resource set; determining, based at least in part on a transmission configuration indicator (TCI) state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state; transmitting, based at least in part on the set of power control parameters, a first SRS associated with the first SRS resource set; and transmitting, based at least in part on the set of power control parameters, a second SRS associated with the second SRS resource set.

Aspect 2: The method of Aspect 1, wherein the set of power control parameters indicates at least one of a nominal power, a path loss compensation factor, a path loss reference signal, or a closed loop index.

Aspect 3: The method of either of Aspects 1 or 2, wherein an indicated TCI state corresponds to the first SRS resource set and the second SRS resource set, the indicated TCI state comprising the first TCI state or the second TCI state.

Aspect 4: The method of either of Aspects 1 or 2, wherein an indicated TCI state does not correspond to either the first SRS resource set or the second SRS resource set.

Aspect 5: The method of any of Aspects 1-4, wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

Aspect 6: The method of any of Aspects 1-4, wherein the set of power control parameters is associated with a TCI state associated with an SRS resource having an SRS resource identifier (ID) value that is a lowest SRS resource ID value among a set of SRS resource ID values corresponding to the first SRS resource set.

Aspect 7: The method of any of Aspects 1-4, wherein the set of power control parameters corresponds to: a first set of power control parameters associated with a first TCI state of a first SRS resource, of the first SRS resource set, having a first SRS resource identifier (ID) value that is a lowest SRS resource ID value among a first set of SRS resource ID values associated with the first SRS resource set, and a second set of power control parameters associated with a second TCI state of a second SRS resource, of the second SRS resource set, having a second SRS resource ID value that is a lowest SRS resource ID value among a second set of SRS resource ID values associated with the second SRS resource set.

Aspect 8: The method of Aspect 7, wherein the first set of power parameters is equivalent to the second set of power parameters.

Aspect 9: The method of Aspect 7, wherein the first TCI state is equivalent to the second TCI state.

Aspect 10: The method of Aspect 7, wherein the first SRS resource is equivalent to the second SRS resource.

Aspect 11: The method of Aspect 10, wherein a first list of SRS resources configured for the first SRS resource set is ordered according to an order of the first set of SRS resource ID values, and wherein a second list of SRS resources configured for the second SRS resource set is ordered according to an order of the second set of SRS resource ID values.

Aspect 12: The method of Aspect 11, wherein the first SRS resource is listed within a first subset of SRS resources of the first SRS resource set, wherein a quantity of SRS resources in the first subset of SRS resources is equivalent to a quantity of SRS resources of the second SRS resource set.

Aspect 13: The method of any of Aspects 1-12, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value.

Aspect 14: The method of any of Aspects 1-12, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

Aspect 15: A method of wireless communication performed by a network node, comprising: transmitting a sounding reference signal (SRS) configuration comprising a first list of SRS resource sets indicating a first SRS resource set and a second list of SRS resource sets indicating a second SRS resource set; receiving a first SRS, associated with the first SRS resource set, based at least in part on a set of power control parameters corresponding to the first SRS resource set and the second SRS resource set, wherein the set of power control parameters is based at least in part on a transmission configuration indicator (TCI) state configuration that indicates at least one of a first TCI state or a second TCI state, wherein each of the first TCI state and the second TCI state comprises a downlink TCI state, an uplink TCI state, or a joint downlink/uplink TCI state; and receiving, based at least in part on the set of power control parameters, a second SRS associated with the second SRS resource set.

Aspect 16: The method of Aspect 15, wherein the set of power control parameters indicates at least one of a nominal power, a path loss compensation factor, a path loss reference signal, or a closed loop index.

Aspect 17: The method of either of Aspects 15 or 16, wherein an indicated TCI state corresponds to the first SRS resource set and the second SRS resource set, the indicated TCI state comprising the first TCI state or the second TCI state.

Aspect 18: The method of either of Aspects 15 or 16, wherein an indicated TCI state does not correspond to either the first SRS resource set or the second SRS resource set.

Aspect 19: The method of any of Aspects 15-18, wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

Aspect 20: The method of any of Aspects 15-18, wherein the set of power control parameters is associated with a TCI state associated with an SRS resource having an SRS resource identifier (ID) value that is a lowest SRS resource ID value among a set of SRS resource ID values corresponding to the first SRS resource set.

Aspect 21: The method of any of Aspects 15-18, wherein the set of power control parameters corresponds to: a first set of power control parameters associated with a first TCI state of a first SRS resource, of the first SRS resource set, having a first SRS resource identifier (ID) value that is a lowest SRS resource ID value among a first set of SRS resource ID values associated with the first SRS resource set, and a second set of power control parameters associated with a second TCI state of a second SRS resource, of the second SRS resource set, having a second SRS resource ID value that is a lowest SRS resource ID value among a second set of SRS resource ID values associated with the second SRS resource set.

Aspect 22: The method of Aspect 21, wherein the first set of power parameters is equivalent to the second set of power parameters.

Aspect 23: The method of Aspect 21, wherein the first TCI state is equivalent to the second TCI state.

Aspect 24: The method of Aspect 21, wherein the first SRS resource is equivalent to the second SRS resource.

Aspect 25: The method of Aspect 24, wherein a first list of SRS resources configured for the first SRS resource set is ordered according to an order of the first set of SRS resource ID values, and wherein a second list of SRS resources configured for the second SRS resource set is ordered according to an order of the second set of SRS resource ID values.

Aspect 26: The method of Aspect 25, wherein the first SRS resource is listed within a first subset of SRS resources of the first SRS resource set, wherein a quantity of SRS resources in the first subset of SRS resources is equivalent to a quantity of SRS resources of the second SRS resource set.

Aspect 27: The method of any of Aspects 15-26, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value.

Aspect 28: The method of any of Aspects 15-26, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a sounding reference signal (SRS) configuration comprising a first list of SRS resource sets indicating a first SRS resource set and a second list of SRS resource sets indicating a second SRS resource set;
determine, based at least in part on a transmission configuration indicator (TCI) state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state;
transmit, based at least in part on the set of power control parameters, a first SRS associated with the first SRS resource set; and
transmit, based at least in part on the set of power control parameters, a second SRS associated with the second SRS resource set,
wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

2. The UE of claim 1, wherein the set of power control parameters indicates at least one of a nominal power, a path loss compensation factor, a path loss reference signal, or a closed loop index.

3. The UE of claim 1, wherein an indicated TCI state corresponds to the first SRS resource set and the second SRS resource set, the indicated TCI state comprising the first TCI state or the second TCI state.

4. The UE of claim 1, wherein the set of power control parameters is associated with a TCI state associated with an SRS resource having an SRS resource identifier (ID) value that is a lowest SRS resource ID value among a set of SRS resource ID values corresponding to the first SRS resource set.

5. The UE of claim 1, wherein the set of power control parameters corresponds to:
a first set of power control parameters associated with a first TCI state of a first SRS resource, of the first SRS resource set, having a first SRS resource identifier (ID) value that is a lowest SRS resource ID value among a first set of SRS resource ID values associated with the first SRS resource set, and
a second set of power control parameters associated with a second TCI state of a second SRS resource, of the second SRS resource set, having a second SRS resource ID value that is a lowest SRS resource ID value among a second set of SRS resource ID values associated with the second SRS resource set.

6. The UE of claim 5, wherein the first set of power parameters is equivalent to the second set of power parameters.

7. The UE of claim 5, wherein the first TCI state is equivalent to the second TCI state.

8. The UE of claim 5, wherein the first SRS resource is equivalent to the second SRS resource.

9. The UE of claim 8, wherein a first list of SRS resources configured for the first SRS resource set is ordered according to an order of the first set of SRS resource ID values, and wherein a second list of SRS resources configured for the second SRS resource set is ordered according to an order of the second set of SRS resource ID values.

10. The UE of claim 9, wherein the first SRS resource is listed within a first subset of SRS resources of the first SRS resource set, wherein a quantity of SRS resources in the first subset of SRS resources is equivalent to a quantity of SRS resources of the second SRS resource set.

11. The UE of claim 1, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets that list indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value.

12. The UE of claim 1, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

13. A network node for wireless communication, comprising:
a memory; and
one or more processors, coupled to the memory, configured to:
transmit a sounding reference signal (SRS) configuration comprising a first list of SRS resource sets indicating a first SRS resource set and a second list of SRS resource sets indicating a second SRS resource set;
receive a first SRS, associated with the first SRS resource set, based at least in part on a set of power control parameters corresponding to the first SRS resource set and the second SRS resource set, wherein the set of power control parameters is based at least in part on a transmission configuration indicator (TCI) state configuration that indicates at least one of a first TCI state or a second TCI state, wherein each of the first TCI state and the second TCI state comprises a downlink TCI state, an uplink TCI state, or a joint downlink/uplink TCI state; and receive, based at least in part on the set of power control parameters, a second SRS associated with the second SRS resource set, wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

14. The network node of claim 13, wherein the set of power control parameters is associated with a TCI state associated with an SRS resource having an SRS resource identifier (ID) value that is a lowest SRS resource ID value among a set of SRS resource ID values corresponding to the first SRS resource set.

15. The network node of claim 13, wherein the set of power control parameters corresponds to:
a first set of power control parameters associated with a first TCI state of a first SRS resource, of the first SRS resource set, having a first SRS resource identifier (ID) value that is a lowest SRS resource ID value among a first set of SRS resource ID values associated with the first SRS resource set, and
a second set of power control parameters associated with a second TCI state of a second SRS resource, of the second SRS resource set, having a second SRS resource ID value that is a lowest SRS resource ID value among a second set of SRS resource ID values associated with the second SRS resource set.

16. The network node of claim 15, wherein the first set of power parameters is equivalent to the second set of power parameters.

17. The network node of claim 15, wherein the first TCI state is equivalent to the second TCI state.

18. The network node of claim 15, wherein the first SRS resource is equivalent to the second SRS resource.

19. The network node of claim 18, wherein a first list of SRS resources configured for the first SRS resource set is ordered according to an order of the first set of SRS resource ID values, and wherein a second list of SRS resources configured for the second SRS resource set is ordered according to an order of the second set of SRS resource ID values.

20. The network node of claim 19, wherein the first SRS resource is listed within a first subset of SRS resources of the first SRS resource set, wherein a quantity of SRS resources in the first subset of SRS resources is equivalent to a quantity of SRS resources of the second SRS resource set.

21. The network node of claim 13, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a lowest value between the first SRS resource set ID value and the first additional SRS resource set ID value, and the second SRS resource set corresponds to an SRS resource set ID value that is a lowest value between the second SRS resource set ID value and the second additional SRS resource set ID value.

22. The network node of claim 13, wherein the first SRS resource set corresponds to a first SRS resource set identifier (ID) value and the second SRS resource set corresponds to a second SRS resource set ID value, wherein the first list of SRS resource sets indicates a first additional SRS resource set corresponding to a first additional SRS resource set ID value and the second list of SRS resource sets indicates a second additional SRS resource set corresponding to a second additional SRS resource set ID value, and wherein the first SRS resource set corresponds to an SRS resource set ID value that is a highest value between the first SRS resource set ID value and the first additional SRS resource set ID value, and the second SRS resource set corresponds to an SRS resource set ID value that is a highest value between the second SRS resource set ID value and the second additional SRS resource set ID value.

23. A method of wireless communication performed by a user equipment (UE), comprising:
receiving a sounding reference signal (SRS) configuration comprising a first list of SRS resource sets indicating a first SRS resource set and a second List of SRS resource sets indicating a second SRS resource set;
determining, based at least in part on a transmission configuration indicator (TCI) state configuration that indicates at least one of a first TCI state or a second TCI state, a set of power control parameters corresponding to the first SRS resource set and the second SRS resource set, wherein each of the first TCI state and the second TCI state comprises a downlink TCI state, an uplink TCI state, or a joint downlink/uplink TCI state;
transmitting, based at least in part on the set of power control parameters, a first SRS associated with the first SRS resource set; and
transmitting, based at least in part on the set of power control parameters, a second SRS associated with the second SRS resource set,
wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

24. The method of claim 23, wherein the set of power control parameters indicates at least one of a nominal power, a path loss compensation factor, a path loss reference signal, or a closed loop index.

25. A method of wireless communication performed by a network node, comprising:
transmitting a sounding reference signal (SRS) configuration comprising a first List of SRS resource sets indicating a first SRS resource set and a second List of SRS resource sets indicating a second SRS resource set;
receiving a first SRS, associated with the first SRS resource set, based at least in part on a set of power control parameters corresponding to the first SRS resource set and the second SRS resource set, wherein the set of power control parameters is based at least in part on a transmission configuration indicator (TCI) state configuration that indicates at least one of a first TCI state or a second TCI state, wherein each of the first TCI state and the second TCI state comprises a downlink TCI state, an uplink TCI state, or a joint downlink/uplink TCI state; and receiving, based at least in part on the set of power control parameters, a second SRS associated with the second SRS resource set, wherein the set of power control parameters is associated with a TCI state associated with an SRS resource having an SRS resource identifier (ID) value that is a lowest SRS resource ID value among a set of SRS resource ID values corresponding to a combined set of SRS resources, the combined set of SRS resources corresponding to a union of the first SRS resource set and the second SRS resource set.

26. The method of claim 25, wherein an indicated TCI state does not correspond to either the first SRS resource set or the second SRS resource set.

* * * * *